(12) United States Patent
Nair et al.

(10) Patent No.: US 7,640,345 B2
(45) Date of Patent: Dec. 29, 2009

(54) INFORMATION MANAGEMENT

(75) Inventors: Manoj Nair, Cary, NC (US); Stephen Perrin, Chapel Hill, NC (US); Iva Blazina Vukelja, Everett, MA (US); Arun Dugganapally, Charlestown, MA (US); John Philip Bell, II, Skibbereen (IE); Alex Rankov, Danville, CA (US); Mark Weng Soon Wah, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/528,900

(22) Filed: Sep. 27, 2006

(65) Prior Publication Data

US 2008/0071908 A1 Mar. 20, 2008

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 15/16* (2006.01)
(52) U.S. Cl. ...................................... 709/226
(58) Field of Classification Search ................ 709/223, 709/226; 707/100, 102
See application file for complete search history.

(56) References Cited

U.S. PATENT DOCUMENTS

| 6,167,445 A * | 12/2000 | Gai et al. ..................... 709/223 |
| 6,591,300 B1 * | 7/2003 | Yurkovic ..................... 709/226 |
| 6,633,312 B1 * | 10/2003 | Rochford et al. ............ 715/736 |
| 7,185,073 B1 * | 2/2007 | Gai et al. ..................... 709/221 |
| 7,363,292 B2 | 4/2008 | Chaboche |
| 2002/0016800 A1 * | 2/2002 | Spivak et al. ............... 707/523 |
| 2003/0023587 A1 | 1/2003 | Dennis et al. |

(Continued)

FOREIGN PATENT DOCUMENTS

WO  WO 2008/036621  3/2008

OTHER PUBLICATIONS

U.S. Appl. No. 11/692,051, filed Mar. 27, 2007, Perrin et al.

(Continued)

*Primary Examiner*—William C Vaughn, Jr.
*Assistant Examiner*—Scott Christensen
(74) *Attorney, Agent, or Firm*—Workman Nydegger

(57) ABSTRACT

Providing information management in a networked environment. Information management provides services such as data protection, backup, retention, compliance, etc., by classifying the objects and/or infrastructure of an entity according to its value to the entity. Information management begins by discovering the data in a network and by discovering the servers and services operating in a network. Next, the data is classified according to rules that can be set by the entity, by the line of business within the entity, by regulation, and the like. Often, classification includes the collection and/or generation of metadata. After the data is classified, service level objectives can be identified and mapped to service levels. After service levels are selected, the corresponding actions can be orchestrated such that the objects of the entity received the selected services in the service level.

18 Claims, 4 Drawing Sheets

U.S. PATENT DOCUMENTS

| | | |
|---|---|---|
| 2003/0023712 A1* | 1/2003 | Zhao et al. .................. 709/223 |
| 2003/0093528 A1 | 5/2003 | Rolia |
| 2003/0167180 A1 | 9/2003 | Chung et al. |
| 2003/0212778 A1 | 11/2003 | Collomb |
| 2003/0233391 A1 | 12/2003 | Crawford et al. |
| 2004/0215650 A1 | 10/2004 | Shaji et al. |
| 2005/0071182 A1 | 3/2005 | Aikens et al. |
| 2005/0125768 A1 | 6/2005 | Wong et al. |
| 2005/0131982 A1 | 6/2005 | Yamasaki et al. |
| 2005/0197852 A1 | 9/2005 | Gebhard et al. |
| 2005/0262097 A1 | 11/2005 | Sim-Tang et al. |
| 2006/0095543 A1 | 5/2006 | Ito et al. |
| 2006/0101084 A1 | 5/2006 | Kishi et al. |
| 2006/0112108 A1 | 5/2006 | Eklund et al. |
| 2006/0236061 A1 | 10/2006 | Koclanes |
| 2007/0055689 A1 | 3/2007 | Rhoads et al. |
| 2007/0058632 A1 | 3/2007 | Back et al. |
| 2007/0192352 A1 | 8/2007 | Levy |
| 2007/0226228 A1 | 9/2007 | Her et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0077682 A1 | 3/2008 | Nair et al. |
| 2008/0114725 A1 | 5/2008 | Indeck et al. |
| 2008/0177994 A1 | 7/2008 | Mayer |
| 2009/0157881 A1 | 6/2009 | Kavuri et al. |

OTHER PUBLICATIONS

U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/722,192, filed Jun. 30, 2007, Nair et al.
U.S. Appl. No. 11/528,772, filed Sep. 12, 2008, Pre-Interview First Office Action.
U.S. Appl. No. 11/528,783, filed Nov. 7, 2008, Pre-Interview First Office Action.
U.S. Appl. No. 11/528,898, filed Sep. 5, 2008, Pre-Interview First Office Action.
U.S. Appl. No. 11/528,783, filed Feb. 24, 2009, Office Action.
U.S. Appl. No. 11/528,898, filed Feb. 9, 2009, First Action Interview.
U.S. Appl. No. 11/528,898, filed Apr. 3, 2009, Office Action.
U.S. Appl. No. 11/694,753, filed Mar. 25, 2009, Office Action.
U.S. Appl. No. 11/694,783, filed Feb. 6, 2009, Office Action.
U.S. Appl. No. 11/528,772, Jun. 3, 2009, Final Office Action.
U.S. Appl. No. 11/528,783, Jun. 25, 2009, Final Office Action.
U.S. Appl. No. 11/692,058, Jul. 9, 2009, Office Action.
U.S. Appl. No. 11/692,051, Aug. 26, 2009, Office Action.
U.S. Appl. No. 11/772,179, Aug. 19, 2009, Office Action.

* cited by examiner

INFORMATION MANAGEMENT

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND OF THE INVENTION

1. The Field of the Invention

The present invention relates to information management. More particularly, embodiments of the invention relate to systems and methods for classification-based management of structured and/or unstructured data.

2. The Relevant Technology

The world is slowly and continually moving from being paper-based to being electronic-based and this is becoming apparent in a wide variety of different systems. Businesses, schools, and even home life are transitioning to electronic systems. For example, email is becoming a primary means of communication rather than sending regular mail. Bills are paid online. Airlines often prefer electronic ticketing and online check-in. The list goes on. There are several reasons for this transition, one of which is the convenience and accessibility of electronic systems. Email, for example, often arrives shortly after sending it.

As entities become more centered on electronic data, the ability to manage the electronic data becomes crucial for a wide variety of different reasons. Much of the electronic data maintained by an entity or organization often relates to different aspects of the entity and often is subject to various considerations.

Further, much of the data is unstructured at least in the sense that the data's value to the entity is not readily know and the services required for the data is not necessarily known. For example, an entity may have a file storage system that it backs up on a regular basis. However, there may be many files on the file storage system that have little or no value to the entity. As a result, the entity is often paying for services that are not required. Further, there may be files that contain certain information that subjects those files to certain regulations. Because the content of those files is often unknown, the files are not receiving adequate services, thereby subjecting the entity to potential liability.

More generally, there are a number of different factors that may determine how certain data is handled or that determine the services that are needed for the data. Some of the factors or considerations include data security, data backup, data retention, data access control, regulatory compliance, corporate compliance, and the like or any combination thereof.

The unstructured nature of most systems often makes it difficult to ensure that the proper services are sought. However, making decisions on how to manage the data of an entity is often further complicated by the organization of the entity irrespective of the data. For example, any given entity typically has more than one "line of business." An engineering firm that performs contract work for the government, for instance, often has data that is associated with the engineering being performed. At the same time, the engineering firm may also have data that is associated with the legal department or corporate aspect of the engineering firm, data that is associated with human resources, and the like. In other words, a given entity often has various domains of data or different shares of data, some of which may be shared by the various lines of business.

In each line of business, there is often data that may be subject to certain requirements that are different from requirements that exist with respect to data in the other lines of business. Further, each line of business may have a different way of referring to types of data. All of these differences combine to make providing information management a complex and difficult process.

In today's world, entities are faced with questions such as identifying the levels of security or retention that apply to various files or needing to know which data is critical to the business. Entities must also account for the effects of time on certain data. Data that is associated with a cancelled project, for example, may no longer require certain services.

In sum, the data of an entity is an important assets and must be safeguarded at all times. This means that services such as back, retention, encryption, etc., need to be obtained. As indicated above, conventional systems do not enable entities to effectively manage their data. As a result, these entities either have too much or too little protection for their data. Entities need a way to manage their data so as to comply with all relevant requirements without purchasing too many services and without providing insufficient services. Entities also need a way to manage their data in an ongoing manner as conditions in the entity change.

BRIEF SUMMARY OF THE INVENTION

These and other limitations are overcome by embodiments of the invention, which relates to systems and methods for providing information management. Information management according to embodiments of the invention, enables an entity to ensure that its data receives the services that are required. The services that are required for that data can vary widely and are dependent on multiple factors. This complexity leads, in conventional systems, to situations where services are received, but are not necessarily needed, or to situations where services are needed, but not received, results that not optimal for customers.

Embodiments of the invention relate to an information management system that can evaluate data to identify the appropriate service levels. However, embodiments of the invention also enables entities to better evaluate and value their existing data, even when service levels are not changed. In other words, the ability to classify environments and data as well as generate reports is within the scope of the invention. In one example, the ability to know what services are required for data helps an entity better understand its data.

Embodiments of the invention enable data, including unstructured data, to be classified in a manner that permits an entity to receive the services that it requires. Information management enables an entity to control services with multiple degrees of granularity. In this manner, specific files can receive services that other files do not even when they are grouped in the same file system.

In order to provide information management, the information management system first seeks to discover objects in a computer systems such as a network. The objects can include data, servers, and/or services operating or present in the network. As these objects are discovered, they can be classified based on what is known about them. During the classification process, existing metadata can be augmented with generated metadata. This ensures that more information is available for the classification.

During classification, the data is typically assigned at least one category. Some of the data may be assigned multiple categories. Once the categories are assigned, then service level objectives can be defined and mapped to service levels. After the service levels are selected, the information management system then orchestrates the implementation of the selected services.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
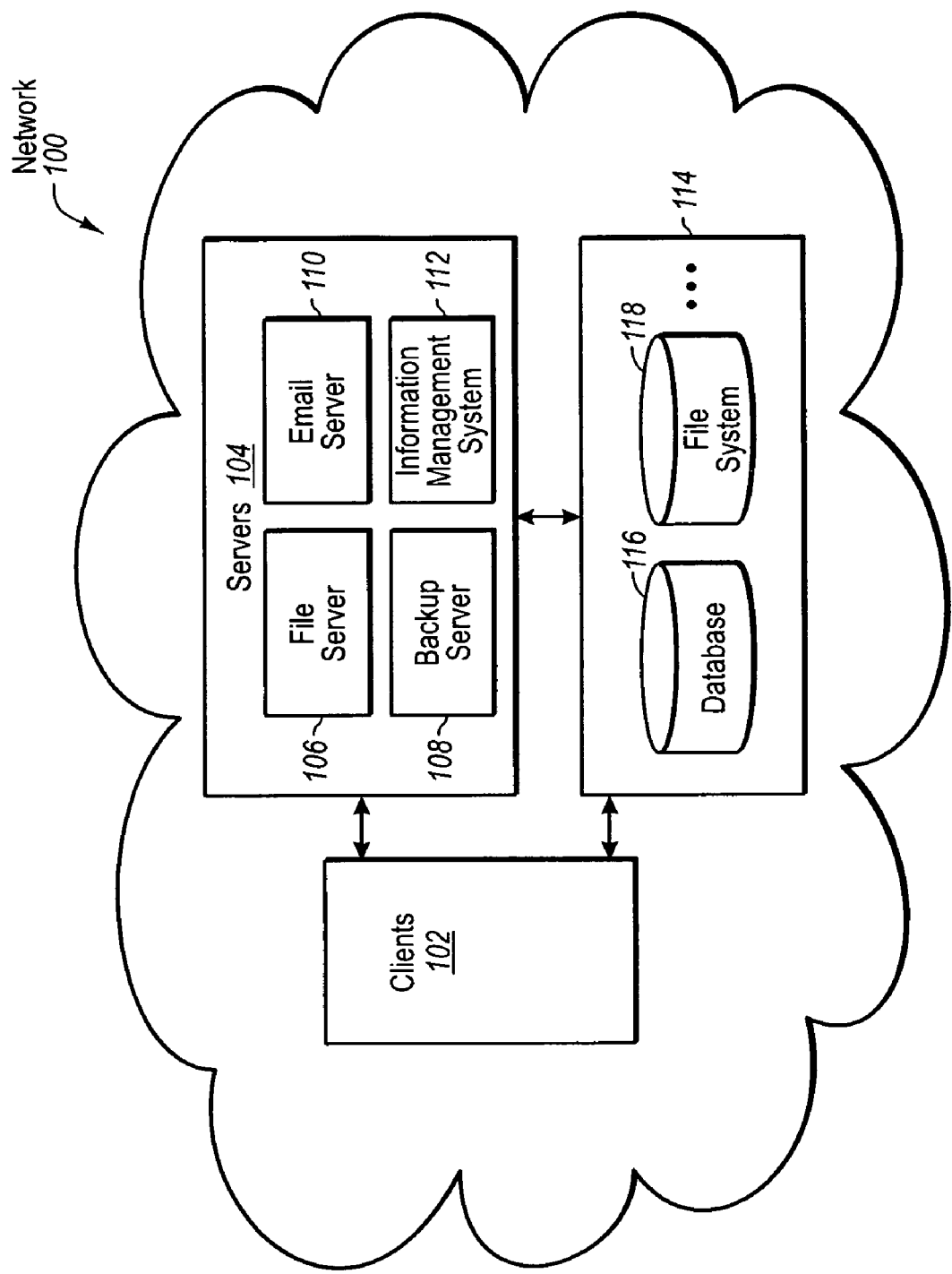
FIG. 1 illustrates an exemplary environment for implementing embodiments of the invention.

Embodiments of the invention relate to information or data management. Information management enables the orchestration of services such as data protection, data placement, corporate compliance, and others based on the value of the underlying data. Embodiments of the invention enable the data to be classified in an automated fashion and provides various levels of granularity that can be adjusted as needed. Further, data management in accordance with the present invention enables services to be provided to data regardless of where or how the data is stored. An entity can be assured that its data is receiving the services that are actually required.

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, file, and the like or any combination thereof.

Implementing information management in accordance with the present invention requires an understanding of the computer system or of servers operating on the computer system, services operating on the computer system, and of the data (files, information, emails, etc.) that exists in or is accessible by clients, servers, and services on the computer system. This knowledge can be obtained through discovery of the computer system, which provides the information management system with an understanding of the relationships that may exist between the various servers (and other devices) on the computer system and the data that is accessible over the computer system. The discovery of a computer system provides the information management with information that can be used to classify the computer system and the data in the computer system.

After the computer system (infrastructure and data) has been discovered, it is useful to classify the data that is in the computer system. Classification is a process that enables each object to be grouped with other objects or be examined in a manner that enables the needed services for that object to be identified. For example, all objects that need a particular service may be grouped. Alternatively, embodiments of the invention enable each object to be categorized and classified individually. As a result, the service needs of each object are considered. Thus, the groupings identified herein are distinct from coarse groupings that fail to consider the service needs of the objects individually. An object can be any data (e.g., file), server, service, application or the like in the network. Classification typically assigns each object to one or more categories. If available, information management enables each object to receive the services that each object requires. More common, service are typically provided in packages. As a result, the service level objects as identified by the assigned categories are often matched to the best available service package. Embodiments of the invention, however, are not so limited.

Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data.

Information management is also a process that can be ongoing. In most computer systems, objects are continually added and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

I. Exemplary Environment of a Computer System

FIG. 1 illustrates an exemplary environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a computer system is not limited to the objects in the computer system but also includes discovery of the servers and services that are operating in the computer system. An understanding of the servers, applications, and services in a computer system can improve the ease and accuracy with which objects are classified.

In this example, the system 100 includes a network such as a local area network, a wide area network, and the like or any combination thereof. The connections in the system 100 can be wired and/or wireless. In this case, the computer system 100 typically includes clients 102 that have access to various servers 104 and to data 114. Various services and/or applications are typically provide by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the computer system 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

II. Information Management in a Networked Environment

Information management according to embodiments of the invention has several components that work together to provide an understanding of the value of an entity's information. In some instances, the entity itself can provide or define some of the logic or rules that is used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for that data reflect the entity's perception of the object's worth.

For example, an entity may want to retain objects that were authored by a particular person for a long time. A rule to that effect that is processed for the objects of the entity can then help classify the objects in an automated manner and the entity is assured that all objects that satisfy that requirement are receiving the appropriate services. More generally, an information management system can examine all business objectives for files, not just one at a time. For example, some of the files authored by a particular person may contain personal data on employees who have left the entity. Such files often fall under laws that require their destruction after a certain time period. Thus, some of the files authored by the person may need to be retained for a shorter length of time due to a more pressing consideration (regulations). One embodiment of information management can thus consider both the desire to retain files written by the author and consider regulations at the same time, for each object. Embodiments of information management can recognize conflicting service goals, as in this example, and then resolve the conflict. At the same time, some of the business objects may be additive. For instance, the entity may also desire to index all files written by the specific person.

Information management also reduces various risks (such as non-compliance) often associated with unstructured data. As described below, embodiments of the invention provide a system for classifying data such that the appropriate services can be provided to the entity's data. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

A. Discovery in Information Management

Figure 2:
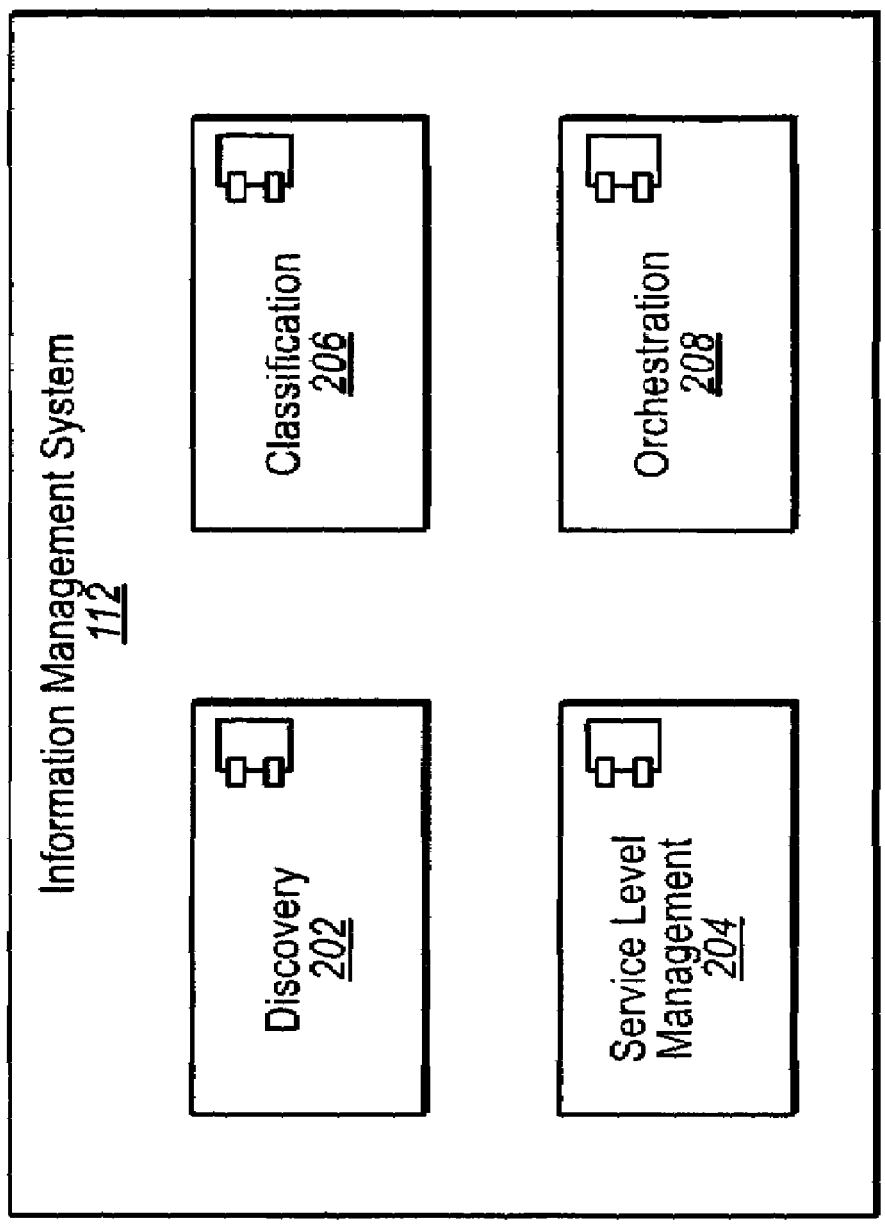
FIG. 2 illustrates one embodiment of a system and/or method for providing information management.

FIG. 2 is a flow diagram illustrating an exemplary system and method for information management of data including unstructured data files or objects. FIG. 2 provides a preliminary overview of information management, which is discussed in more detail with respect to FIGS. 3 and 4.

Discovery 202 is often the first element of information management. According to embodiments of the invention, discovery 202 includes both a discovery of the infrastructure and of the objects (data, files, etc.) in the network.

The discovery of the infrastructure, for example, can include a discovery of all IP devices on the computer system 100 that appear to act as a server. In to discovering these servers, discovery 202 includes discovering services as well. Thus, discovery 202 includes discovering the servers, services, and data residing in a network. Information management can also discover devices, servers, and/or applications that offer services, what kinds of service each offers, and what levels of service or capabilities are supported by that service provider.

The discovery of a computer system can be done in a variety of ways. The discovery of the infrastructure, for example, may involve an examination or analysis of all IP addresses existing in a network. Devices that act as a server can thus be identified. Once these servers are identified, additional information can then be sought from those servers. Applications can also be identified. For example, many entities often have a payroll application that includes a software program working in conjunction with a database. The database can be examined and may have certain table or logs when acting, for example, as source for payroll. The traffic on the network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other data or objects.

B. Classification in Information Management

Classification 206 is typically the next step in information management. Classification 206 is the process of collecting information about the data and/or of the infrastructure of a network and then identifying or associating the data or objects with categories. One result of classification is to associate objects being classified with certain categories. More particularly, the information collected during discovery 202 can be used during classification 206. The resulting categories assigned to objects in the computer system can be used in subsequent parts of information management as described below.

Classification 206, however, is not limited to the information collected during discovery. Classification 206 can also include, for example, applying sets of rules to the objects in a network. The rules can be default rules or rules that are selected according to a line of business of the entity or for any other reason. For example, objects that includes social security numbers may have to be retained for some period of time per governmental regulations. Alternatively, objects whose owner is a member of marketing may only be retained for a few years, but require full indexing.

In addition to applying rules to the objects of the entity, classification 206 also includes the generation of metadata as well as the use of existing metadata. Generated metadata includes values that are derived from an information objects rather than having been collected by the environment. For example, hash values can be generated and then used to identify duplicate objects. Another example of generated metadata is the case where the objects are examined for specified keywords and/or patterns. This generated metadata, or metadata derived from an object being analyzed, are useful during the classification process.

Existing metadata, on the other hand, can be collected from the objects or from the environment. For example, the owner, size, share, etc., of an object can be collected and used to automatically categorize an object. The collected metadata (such as file owner) can be used by rules to categorize the content of the object or the object itself. In some embodiments, a particular object may be associated with more than one category.

In another embodiment, aging considerations can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

C. Service Level Management in Information Management

After the objects have been categorized during classification 206, service level objectives can then be identified for the various objects. A category can be mapped through configuration data to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic.

In other words, the classification process has already assigned categories to each of the objects. During the classification process, some of the various categories are assigned to each object as applicable. These categories can then be used to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time.

In this manner, the object that has been classified is then processed (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually provided from service providers. If the service level objectives do not match or are not satisfied by the best matching actual service package, then a service gap is present.

The use of packages is often used by some entities that manage some or all of their services by restricting the offerings to a number of supported combinations of service levels. In other words, the particular combination of service level objects may not represent a supported package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration is the process by which the services are orchestrated. Orchestration can automate multiple service actions and translate and end user service level request to provider action. The workflow needed to execute the services are coordinated during orchestration.

III. Information Management

Figure 3:
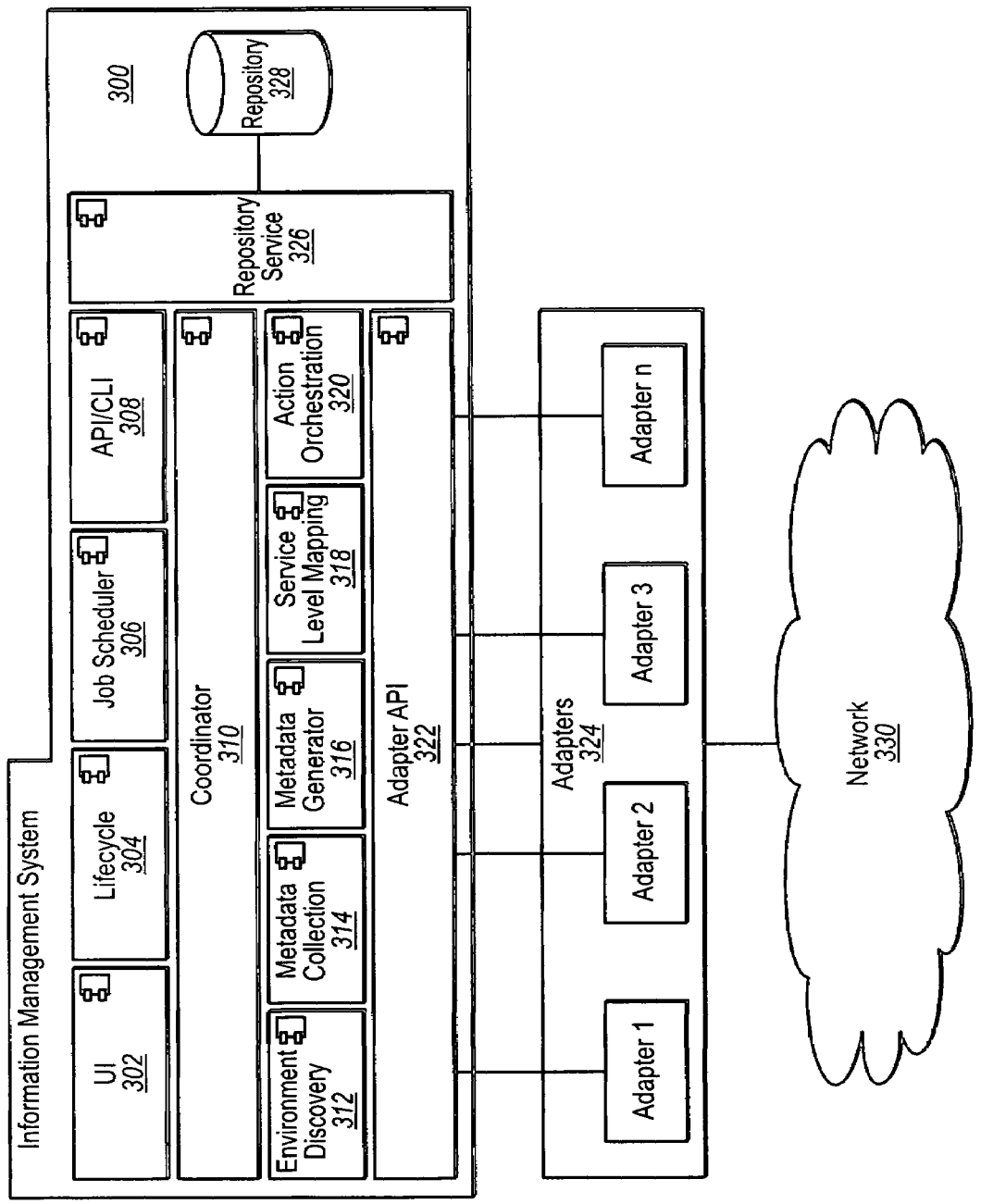
FIG. 3 illustrates an exemplary architecture for information management in a network environment.

FIG. 3 illustrates one embodiment of an architecture for information management. This embodiment of information management uses adapters to interface with a computer system. By using adapters, the information management system 300 provides scalability and adaptability as the computer system configuration changes over time.

In this example, the system 300 includes an adapter API 322 that interfaces with a plurality of adapters 324. The adapters 324 are used by the information management system 300 to interface with network. Information management 300 uses adapters 324 to discover the infrastructure of the network, to discover the objects (data, files, information, etc.) of the network, for classification of the data, and/or for action orchestration.

The adapters 324 can each be specifically prepared to enable the information management system 300 to interface and interact with various aspects of the network. For example, one adapter may enable the system 300 to discover IP devices on the network that are acting like servers. Another adapter may enable the system 300 to discover more information about specific types of network attached storage (NAS). Another adapter may enable the system 300 to examine or watch the network in order to discover applications. Adapters 324 can be used in metadata generation, by service orchestration to talk with various components about provided servers. Adapters 324 may also be used to deliver the services.

For example, if a particular NAS has its own adapter, that adapter can typically collect more information than what can be collected by a generic adapter. The specific adapter can take advantage of features in the NAS that are not necessarily available to other adapters. As more information is discovered or collected, the information management 300 can perform better classification, enable the data to be better evaluated, and assign more appropriate service level objectives. One of skill in the art can appreciate that many different adapters are possible. The adapters 324 can be used by each aspect of the system 300.

The system 300 includes an adapter manager 322 that provides an interface between the adapters 324 and the system 300. The adapter manager 322 can abstract the interface between the system 300 and the adapters 324 such that adapters can easily be accommodated by the system 300.

The discovery portion 312 of the system 300 uses the adapters 324 to discover the infrastructure and the other objects of the network 330. The discovery portion 312, for example, may use a particular adapter to discover information about a backup server. The discovery portion 312 may also use other adapters to discover the same backup server or to discover objects related to that back up server or within or used by that same backup server. All of the information collected through the adapters 324 can be combined or correlated.

After discovery (or during in some instances), classification is performed. In this embodiment, classification includes metadata collection 314 and metadata generation 316. The metadata collection 314 portion begins to collect metadata about the infrastructure and the objects. This can be performed, for example, by queries through the various adapters 324. Examples of metadata include size, owner, path, line of business, creation date, or any other information that can be collected using an adapter or information that may be provided about the data or device.

Metadata can also be generated during metadata generation 316. For example, metadata generation may use adapters to generate hash files, look for patterns or key works in objects, and the like. The generated metadata generates additional metadata that can be used to classify the data. In this example, the discovery of an object can cascade as additional information is discovered. For example, metadata generation often begins by looking at the metadata of an object to see if the object is worth further processing. Binary files, for example, may not include any data that is useful in the context of later rules. Thus, the rules may be ignored for certain objects. Next, hash rules may be applied, for example to look for duplicate objects. Metadata generation may also use computer information service rules to look for certain key words, patterns, etc., in an object. Classifier rules, can also be used during this process. For example, classifier rules tell how to assign categories to an object (an object with a social security number is categorized as a HIPPA file). Once generated, the assigned categories are another example of metadata. Often, the logic or rules used to classify or categorize an object are defined by the entity. Alternatively, the logic or rules of an entity can augment standard categorization rules. Finally, category assignment rules are executed that assign the data or objects to one or more categories.

Once the categories have been assigned to the various objects, the coordinator 310 can then initiate service level mapping 318. Service level mapping includes identifying service level objectives from the assigned categories of the objects. The desired services are then mapped to services that are actually available. For example, a service provider that offers backup, retention, and other services often offers service packages, but does not typically offer packages that specifically cover every potential need or variation of service. As a result, service level mapping is the process of identifying the best fit based on the service level objectives of an object and the offered service packages. One of skill in the art can appreciate that embodiments of the invention could identify the exact services required for each object, but may be limited by the services that are actually available. As a result, service level mapping includes the process of mapping the services level objectives to available services from the service providers. This process may also identify gaps in service. For example, none of the service packages available satisfy the service level requirements of an object, resulting in a service gap.

Next, the coordinator 310 provides or initiates action orchestration 320. Action orchestration 320 is the process by which the selected services in the service levels can be delivered. In one example, the action orchestration submits a proposal to orchestration adapters. The adapters report their ability to satisfy the proposal of the action orchestration 320 at specified locations. The action orchestration 320 then selects the best location and adapter set to satisfy the service requirements of the data. The actions are then performed.

In another embodiment, action orchestration 320 is not performed or is postponed. It is useful to identify what information management can achieve in a given computer system before actually performing or orchestrating the services. Thus, reports can be generated to provide a preview of what will be orchestrated.

The information management system includes a repository service 326 that has access to a database 326. In one embodiment, the database 328 is used to store infoobjects, which are objects used to record the processing state of data in the network and to record specific information. The infoobject can be persisted for state information and can support dynamic properties. For example, as new objects are discovered or additional classification information is found or accumulated, this information can be recorded and stored in the infoobject. For example, an infoobject may include the categories assigned for data particular object. These categories, as described above, can then be used for service level mapping.

As noted earlier, FIG. 3 provides an illustration of information management. However, there are some aspects of information management that may not be performed repeatedly. The discovery of the infrastructure, for example, happens less frequently because the environment changes less frequently. More frequently, objects such as files, emails, and other data may change more frequently. Files are created, modified, aged, and the like. As a result, the metadata of these objects can be reviewed regularly and the categories can be reevaluated over time. This enables an information management to adapt the services received by the objects of the computer environment as the objects change.

Figure 4:
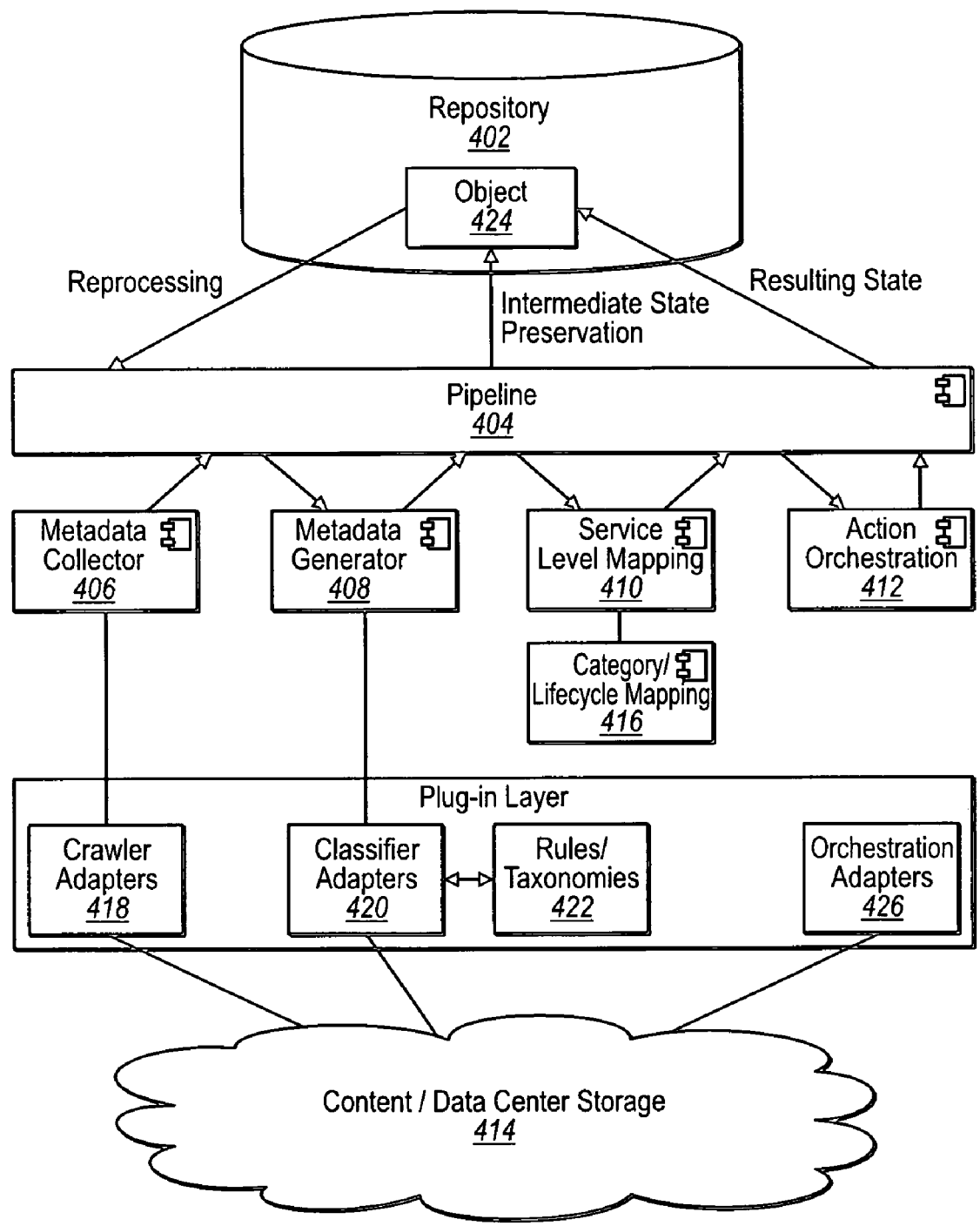
FIG. 4 illustrates a flow diagram for one embodiment of a method for providing information management.

FIG. 4 is a flow diagram illustrating one embodiment of information management. In this example, information management can be viewed as a pipeline that utilizes metadata associated with for each object (e.g., file, email, etc.). The pipeline 404 often begins in the discovery process that uses a collector adapter 406 to discover, in this example, the data center storage 414 and the content stored therein. Thus, the discovery process discovers the infrastructure and the objects. In this example, the information management system has access to the resources of the computer system such as, by way of example only, the data center storage 414 via a plugin 418 that enables more specific information to be collected regarding the infrastructure and content of the storage 414 during discovery. One of skill in the art can appreciate that the information management also has access, as described herein, to applications, servers, services, and the like.

The information collected by the collector adapter 406 can be added to an metadata 424 for each object or each device, or each application, service, etc., that is discovered in the network. After discovery, the pipeline 404 proceeds to the classifier or metadata generator 408. In this example, a plugin 420 may be provided that has access to various rules or taxonomies 422 that are used to classify the various objects as described herein. The rules or taxonomies can include standard rules as well as user-defined rules (also referred to as logic). Further, the classifier 408 may also have access to the objects in the data center storage 414. For example, access may be provided to retrieve metadata, to index the file for additional metadata during metadata generation, and the like. By applying the rules or taxonomies, categories for the objects and devices in the infrastructure are identified and stored in each respective metadata 424. The repository 402 is an example of a database used by information management and stores metadata 424 for each object in the computer system.

The pipeline 404 next proceeds to service level mapping 410, which uses the categories and/or lifecycle information (which may be reflected in the assigned categories) to identify service level objects. Typically, a service level is selected at this point that satisfies the service level objects derived from the various categories assigned to the objects. Finally, the action orchestration 412 occurs to achieve a result 426. Examples of the result 426 include backup, retention, tiered storage, encryption, and the like or any combination thereof for the objects or for the various infrastructure of the network.

Information management enhances the ability of a system to manage its unstructured data across domains or enhances the ability of users to manage their data including unstructured data, across varying lines of business, and by identifying services that best meet the system's or entity's requirements. As discussed above, management of service levels on information requires knowledge of the servers and systems that provide services for the information. Discovery includes the automated acquisition of this knowledge by discovering and applying classification techniques to the environment objects (servers and systems).

In addition to simply discovering and classifying the data of a network embodiments of the invention can cascade the discovery. Cascaded discovery and/or cascaded classification gathering increasingly detailed descriptions of environment data (including infrastructure, applications, services, and content) by using the results from each stage of discovery to drive the next stage. For example when an object is found to be a file server it is probed to see if it is a particular type of file server (among other choices). And if it turns out to be that type of file server, then a specific probe or adapter (including a plugin) will be used to discover firmware version and other configuration information unique to that type of file server.

Once basic information about an object is discovered it can be used to drive further levels of discovery. For example the file type, owner, location etc. can be used to decide whether to analyze the content of the file (e.g., metadata generation), which will yield more information to be used in the information management process.

As previously mentioned, grades of service offered by the environment servers are usually measured in different terms from the descriptions of services required for information. Embodiments of the invention relate further to the application of abstraction to both systems so that they can be compared and matched in a common language. This facilitates the ability of a network to more easily identify the services that are actually provided.

In a single installation the service providers are usually managed in a single uniform system for identifying service levels and relating them to environment data or objects. But the information owners are unlikely to be so uniform. Various groups (lines of business) may have very different systems for determining the business importance of information and the service levels their information needs. Embodiments of the invention provide the ability to recognize independent groupings (domains) of information owners, each of which can configure separate logic for classification and service mapping even though the service options (list of available service levels) are common to all groupings. Furthermore some of the relevant classification and service mapping logic may be common to all domains. For example when the corporate compliance officer decides how to identify files that are subject to HIPAA, the identification logic and recommended service levels should be applied to all files regardless of owner.

Service level mapping is a precise way for configuration data to guide the determination of service levels required for an information object, starting from the categories assigned to the object. This aspect of the invention describes mappings with priorities, lifecycle stages, and user-selectable strategies for selecting appropriate service bundles.

Auction based services covers the idea of realizing the service levels needed for an information object by engaging a set of relevant service providers and having each offer to solve some or part of the problem. In this case, the plans for addressing one service may impact the right strategy for addressing a second service.

One aspect of orchestration enables users or customers to perform searches by indexing the data. However, building indexes can consume significant resources. Advantageously, information management allows the user to use the concepts (discovery, classification, service mapping) described herein to select which information gets indexed. Information management enables indexing to be provided as a service and the service is selected according to the output of the service level mapping.

Conventionally, information management treats each service as a one-dimensional concept, often a simple list of service levels. Embodiments of the invention provide some service areas that are multi-dimensional: several independent decisions must be made to determine the service level needs of each information object. In effect some service areas are groupings of other subordinate service areas.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended, claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing information management in a computer system, the method comprising:
at an information management system,
collecting information about objects in a network, the objects including data, servers and services operating in the network, to discover relationships that exist for the data, servers and services in the network prior to classifying the objects;
individually classifying the objects to assign categories to each object;
mapping the categories assigned to each object to one or more service levels
wherein said mapping the categories assigned to each object maps each object to one or more services levels based on the categories assigned to each object;
mapping the service levels to one or more available services of one or more service providers; and
after mapping the service levels to one or more available services, orchestrating
one of a plurality of services for a particular object from the classified objects comprising:
proposing a particular service from the plurality of services needing to be performed on the particular object based on the categories assigned to the particular object;
identifying a particular service provider that is available to perform the particular service, the particular service provider being located at a specified location; and
transmitting a request to the particular service provider to execute the particular service on the particular object,
wherein the particular object is stored at a location different from the specified location of the particular service provider when the particular service is executed on the particular object.

2. The method of claim 1, wherein collecting information about objects in a network further comprises discovering devices operating in the network by analyzing IP addresses in the network.

3. The method of claim 1, wherein collecting information about objects in a network further comprises using a plurality of adapters to collect information regarding each device or service or data in the network.

4. The method of claim 1, wherein classifying the object to assign categories to each object further comprises applying rules to each object, wherein the rules uses metadata associated with each object.

5. The method of claim 4, further comprising generating additional metadata regarding each object such that the additional metadata is used during classification of each object.

6. The method of claim 5, wherein generating additional metadata includes indexing each relevant object.

7. The method of claim 1, wherein mapping the service levels further comprises identifying gaps in services provided by the one or more service providers of the networked environment.

8. The method of claim 1, wherein the one or more service levels include one or more of file retention, tiered storage, backup services to disk or to tape, snapshot services, disaster recovery, storage, file indexing, access control lists, data protection, encryption, assigning user rights, regulatory compliance, and corporate compliance.

9. The method of claim 1, wherein classifying the objects to assign categories to each object further comprises:
classifying an infrastructure by describing an environment and service level capabilities; and
classifying each object into categories according to business value and/or lifecycle information associated with each object.

10. In a networked environment, a method for providing information management, the method comprising:
at an information management system,
collecting information about objects in a network, the objects including content from a first line of business operating in the network and from a second line of business operating in the network, to discover relationships that exist for the objects;

individually classifying objects existing in a network to assign categories to each object;

determining service levels from the categories assigned to each object, wherein the assigned categories had been previously mapped to one or more service levels;

mapping the service levels to services available from one or more providers;

after mapping the service levels to services available from one or more providers, orchestrating one of a plurality of services service for a particular object from the classified objects comprising:

proposing a particular service from the plurality of services needing to be performed on particular object based on the categories assigned to the particular object;

selecting a particular provider that is available to perform the particular service, the particular service provider being located at a specified location; and transmitting a request to the particular provider to execute the particular service on the particular object, wherein the particular object is stored at a location different from the specified location of the particular service provider when the particular service is executed on the particular object.

11. The method of claim 10, further comprising discovering objects in the network, the objects including the data existing in the network, servers operating in the network, and services operating in the network.

12. The method of claim 11, wherein classifying objects further comprising classifying the servers and the services.

13. The method of claim 11, wherein classifying data further comprises collecting metadata for the objects, wherein at least a portion of the metadata is generated automatically from the objects.

14. The method of claim 13, further comprising applying rules that include an analysis of the metadata to assign the categories to the objects.

15. The method of claim 14, wherein the rules include one or more of hash rules, content analyzer rules, and classifier rules.

16. The method of claim 10, wherein the service levels are applied to content in both the first and second line of business.

17. The method of claim 10, wherein each object is represented by an info object stored in a repository, wherein each info object is used to determine the service levels.

18. The method of claim 10, wherein the services include one or more of file retention, backup services, tiered storage, encryption, disaster recovery, corporate compliance, regulatory compliance, and placement.

* * * * *